(12) United States Patent
Kharas et al.

(10) Patent No.: US 12,551,867 B2
(45) Date of Patent: Feb. 17, 2026

(54) LOW IRON, LOW Z/M FLUID CATALYTIC CRACKING CATALYST

(71) Applicant: BASF CORPORATION, Florham Park, NJ (US)

(72) Inventors: Karl C. Kharas, Iselin, NJ (US); Shen Zhao, Attapulgus, GA (US); Michael B. Sigman, Attapulgus, GA (US)

(73) Assignee: BASF CORPORATION, Florham Park, NJ (US)

( * ) Notice: Subject to any disclaimer, the term of this patent is extended or adjusted under 35 U.S.C. 154(b) by 417 days.

(21) Appl. No.: 17/920,074

(22) PCT Filed: Apr. 22, 2021

(86) PCT No.: PCT/US2021/028532
§ 371 (c)(1),
(2) Date: Oct. 20, 2022

(87) PCT Pub. No.: WO2021/216798
PCT Pub. Date: Oct. 28, 2021

(65) Prior Publication Data
US 2023/0158476 A1    May 25, 2023

Related U.S. Application Data

(60) Provisional application No. 63/013,890, filed on Apr. 22, 2020.

(51) Int. Cl.
| | | |
|---|---|---|
| *B01J 21/00* | (2006.01) | |
| *B01J 21/16* | (2006.01) | |
| *B01J 29/08* | (2006.01) | |
| *B01J 35/00* | (2006.01) | |
| *B01J 35/51* | (2024.01) | |

(Continued)

(52) U.S. Cl.
CPC .......... *B01J 21/16* (2013.01); *B01J 29/084* (2013.01); *B01J 35/19* (2024.01); *B01J 35/51* (2024.01); *B01J 35/613* (2024.01); *B01J 35/615* (2024.01); *C10G 11/05* (2013.01); *C10G 11/18* (2013.01); *C10G 2400/02* (2013.01)

(58) Field of Classification Search
CPC ........ B01J 29/084; B01J 23/745; B01J 37/04; B01J 37/0045; B01J 37/0018; B01J 37/088; B01J 37/10; B01J 35/19; B01J 35/51; B01J 35/613; B01J 35/615; B01J 35/633; B01J 35/647; B01J 35/651; B01J 21/16; C10G 11/02; C10G 11/05; C10G 11/18; C10G 2400/02
See application file for complete search history.

(56) References Cited

U.S. PATENT DOCUMENTS

| | | | | |
|---|---|---|---|---|
| 5,023,220 A | * | 6/1991 | Dight | B01J 29/084 502/79 |
| 8,920,630 B2 | * | 12/2014 | Hadjigeorge | C10G 51/00 208/77 |
| 2002/0115556 A1 | * | 8/2002 | Stockwell | B01J 37/0246 502/63 |

OTHER PUBLICATIONS

International Search Report for PCT/US2021/028532 mailed Aug. 13, 2021, 3 pages.

(Continued)

*Primary Examiner* — Prem C Singh
*Assistant Examiner* — Brandi M Doyle
(74) *Attorney, Agent, or Firm* — Peter DiMauro

(57) ABSTRACT

A support comprising kaolin clay, wherein the kaolin clay comprises less than or equal to about 0.6% by weight of iron, based on total weight of the support.

14 Claims, 7 Drawing Sheets

(51) Int. Cl.
*B01J 35/61* (2024.01)
*C10G 11/05* (2006.01)
*C10G 11/18* (2006.01)

(56) References Cited

OTHER PUBLICATIONS

Souza N.L.A. et al: "Iron contamination of FCC catalysts: Quantification of different crystalline phases and valence states" Applied Catalysis A: General, vol. 569, Jan. 1, 2019 pp. 57-65.

* cited by examiner

US 12,551,867 B2

LOW IRON, LOW Z/M FLUID CATALYTIC CRACKING CATALYST

CROSS REFERENCE TO RELATED APPLICATION(S)

The present application is a national stage entry under 35 U.S.C. § 371 of International Application No. PCT/US2021/028532, filed on Apr. 22, 2021, which claims priority to U.S. Provisional Patent Application No. 63/013,890, filed on Apr. 22, 2020, the entire contents of which are incorporated herein by reference in their entirety.

TECHNOLOGY

The present technology relates generally to fluid catalytic cracking (FCC) catalysts. More specifically, it is related to FCC catalysts having a low iron content and low Z/M ratio.

SUMMARY

In one aspect, the present technology provides a support for a fluid catalytic cracking (FCC) catalyst that includes a kaolin clay, wherein the kaolin clay has less than or equal to about 0.6% by weight of iron, based on total weight of the support. In any embodiment described herein, the kaolin clay may have less than or equal to about 0.5% by weight of iron. In any embodiment herein, the kaolin clay may have less than about 0.3% by weight of iron.

In a related aspect, the present technology provides a fluid catalytic cracking (FCC) catalyst that includes a support and a FCC component, wherein the support includes a kaolin clay comprising less than or equal to about 0.6% by weight of iron, based on total weight of the catalyst.

In a related aspect, the present technology provides a method of cracking a hydrocarbon feed comprising contacting said feed with a FCC catalyst that includes a FCC catalyst as described herein in any embodiment.

DETAILED DESCRIPTION

Figure 1A:
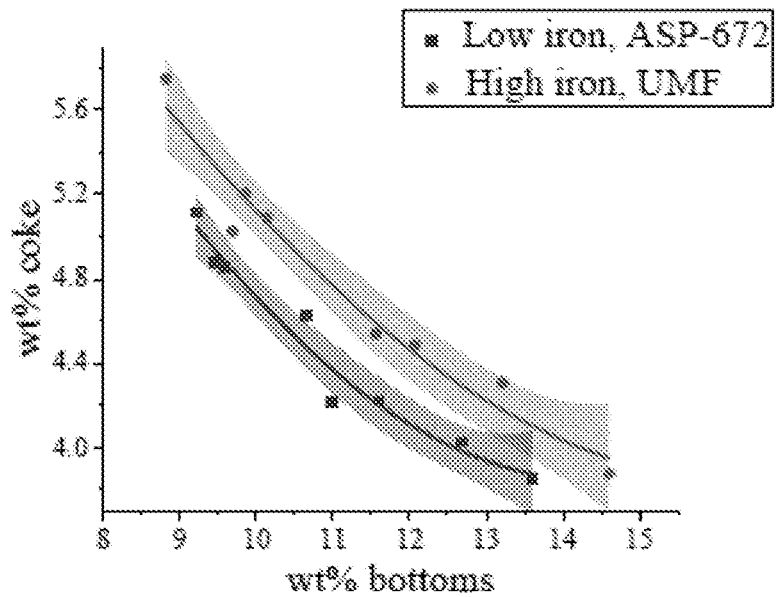
FIG. 1A is a two line graph showing coke (wt %) versus bottoms (wt %) yields plotted for Example-A and Comparative FCC Catalysts, where the data points represent experimental data, the linear plot is a least squares regression correlation, and the shaded area is a 90% confidence band about the regression correlation.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "catalyst" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

"Cracking" refers to typical PCC process conditions. Typical FCC processes are conducted at reaction temperatures of 450° to 650° C. with catalyst regeneration temperatures of 600° to 850° C. Catalytic cracking is a petroleum refining process that is applied commercially on a very large scale. Catalytic cracking, and particularly fluid catalytic cracking (FCC), is routinely used to convert heavy hydrocarbon feeds to lighter products, such as gasoline and distillate range fractions. The cracked products are fractioned into a series of products, including gas, gasoline, light gas oil, and heavy cycle gas oil. Some heavier hydrocarbons may be recycled to the reactor.

As used herein, the term "feed" refers to that portion of crude oil that has a high boiling point and a high molecular weight. In FCC processes, a hydrocarbon feed is injected into the riser section of a FCC unit, where the feed is cracked into lighter, more valuable products upon contacting hot catalyst circulated to the riser-reactor from a catalyst regenerator.

As used herein, the term "zeolite" refers to a crystalline aluminosilicate with a framework based on an extensive three-dimensional network of oxygen ions and have a substantially uniform pore distribution.

As used herein, the term "microsphere" refers to catalyst particles which can be obtained by preforming via spray drying and optionally calcining the kaolin clay and other materials (such as transitional alumina). As is understood by skilled artisans, microspheres are not necessarily perfectly spherical in shape. In addition, microspheres as disclosed herein may be utilized in fluidized catalytic processes.

The present inventors found that the NaY unit cell parameter with low-iron kaolin is consistently smaller than that of high-iron content kaolin. The difference in NaY unit cell parameter is assigned to different numbers of iron present, on average, in the Y zeolite framework of microspheres having either low-iron content kaolin or high-iron content kaolin. Because the size of aluminum and of iron (III) atoms is well-known, the high-iron clay has about four more iron atoms in its NaY zeolite framework than kaolin clay microspheres having less than 0.6% by weight of iron. Since iron is a larger atom than aluminum, it is less stable in zeolite tetrahedral sites and more readily removed than aluminum. Without being bound by theory, the present inventors found that most or all of the iron initially present in the framework of zeolites obtained from high-iron content or low-iron content (i.e., less than 0.6% by weight iron) no longer resides at tetrahedral zeolite framework sites. It is instead highly dispersed in the zeolite. It is believed this highly dispersed iron in zeolite Y catalyzes coke formation, and thus, it is desirable to minimize this content, and preferably contain no highly dispersed iron. Surprisingly, the present inventors found that having less than about five iron atoms present in tetrahedral zeolite framework sites of the NaY form of the FCC catalyst provides an unexpected measurable improvement in catalytic benefits. Accordingly, the present invention demonstrates improved catalytic benefit by decreasing the iron content present in the matrix of the catalyst and the Y-zeolite of the catalyst.

In addition, the inventors have surprisingly found that catalysts having lower iron content (i.e., less than 0.6% by weight of iron) have lower Lewis acidity and, in particular, lower amounts of strong Lewis acidity. Without being bound by theory, it is believed that the Lewis acidity resides mainly on the matrix of the catalyst, not the zeolite. Mössbauer studies show that most of the iron in these catalysts occurs as Fe(III) and is very highly dispersed. At least some of the highly dispersed Fe(III) in the matrix of the catalyst is thought to exhibit Lewis acidity. Decreasing the amount of strong Lewis acidity in the matrix of FCC catalysts should decrease its tendency to make coke.

Described herein are microspheres that include kaolin-clay having a low iron content. Here, it has been surprisingly found that FCC catalysts having kaolin-clay based supports with an iron content of less than 0.6% by weight of detectable iron (e.g., detected as $Fe_2O_3$) exhibits lower coke and dry gas production and improved gasoline yields relative to catalysts having higher iron content. Moreover, it has been surprisingly found that in-situ FCC catalysts as described herein exhibit tolerance to high levels of contaminant iron.

Support for a Fluid Catalytic Cracking Catalyst

In one aspect, the present technology provides a support for a fluid catalytic cracking (FCC) catalyst that includes a kaolin clay, wherein the kaolin clay has less than or equal to about 0.6% by weight of iron, based on total weight of the support. In any embodiment described herein, the kaolin clay may have less than or equal to about 0.5% by weight of iron. In any embodiment herein, the kaolin clay may have less than about 0.3% by weight of iron.

In any embodiment herein, the kaolin clay may include about 0.01% to about 0.6% by weight of iron, based on total weight of the support. For example, in any embodiment disclosed herein, the support may include about 0.01%, about 0.02%, about 0.03%, about 0.04%, about 0.05%, about 0.06%, about 0.07%, about 0.08%, about 0.09%, about 0.1%, about 0.15%, about 0.2%, about 0.25%, about 0.3%, about 0.35%, about 0.4%, about 0.45%, about 0.5%, about 0.55%, about 0.6% by weight of iron, based on total weight of the support, or any range including and/or between any two of these values. In any embodiment disclosed herein, the support may include about 0.01% to about 0.6%, about 0.05% to about 0.5%, about 0.1% to about 0.4%, or 0.1% to about 0.3% by weight of iron, based on total weight of the support.

In any embodiment disclosed herein, the kaolin clay may be free, or substantially free, of iron. As used herein, the term "substantially free of iron" refers to detectable amounts of iron that may be less than about 0.3%, less than about 0.1%, less than about 0.05%, less than about 0.01% by weight based on total weight of the support. In any embodiment disclosed herein, the kaolin clay may be free of iron.

As used herein, the term "free of iron" indicates the kaolin clay does not include any detectable amounts of iron.

In any embodiment disclosed herein, the support may include about 5% to about 100% by weight of the kaolin clay, based on total weight of the support. For example, in any embodiment disclosed herein, the support may include amounts of the kaolin clay of about 5%, about 6%, about 7%, about 8%, about 9%, about 10%, about 11%, about 12%, about 13%, about 14%, about 15%, about 16%, about 17%, about 18%, about 19%, about 20%, about 22%, about 24%, about 26%, about 28%, about 30%, about 32%, about 34%, about 36%, about 38%, about 40%, about 42%, about 44%, about 46%, about 48%, about 50%, about 52%, about 54%, about 56%, about 58%, about 60%, about 62%, about 64%, about 66%, about 68%, about 70%, about 72%, about 74%, about 76%, about 78%, about 80%, about 82%, about 84%, about 86%, about 88%, about 90%, about 92%, about 94%, about 96%, about 98%, 100% by weight based on total weight of the support, or any range including and/or in between any two of these values.

In any embodiment disclosed herein, the kaolin clay may include a calcined kaolin clay. In any embodiment disclosed herein, the kaolin clay may include a mixture of calcined and uncalcined kaolin clay. Additionally or alternatively, in some embodiments, the mixture of calcined and uncalcined clay may undergo further calcination at a temperature around that of the kaolin exotherm (e.g., about 1000° C.) or at a higher temperature sufficient to transform the clay to a mixture of mullite and amorphous silica.

In any embodiment disclosed herein, the support may include one or more additional materials. For example, in any embodiment disclosed herein, the one or more binders may include sodium silicate, transitional alumina, aluminum hydroxide, aluminum trihydroxide, aluminum oxide and/or hydroxide doped with rare earth elements or alkaline earth elements, tin oxide, bismuth oxide, or a combination of two or more thereof. In any embodiment disclosed herein, the support may include an aluminum oxide and/or hydroxide doped with rare earth elements or alkaline earth elements. The rare earth element may be selected from yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof. The alkaline earth element may be selected from magnesium, calcium, strontium, or barium.

In any embodiment disclosed herein, the support may further include alumina. For example, in any embodiment disclosed herein, the alumina may be a transitional alumina. Suitable transitional alumina may include, but is not limited to, $\gamma$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$, or a combination of two or more thereof.

In any embodiment disclosed herein, the support may include about 1% to about 90% by weight of the one or more additional materials, based on total weight of the support. For example, the support may include about 1% to about 90%, about 5% to about 70%, about 10% to about 60%, about 20% to about 40%, about 1% to about 40%, about 1% to about 30%, about 1% to about 20%, by weight of the one or more additional materials, or any range including and/or in between any two of the preceding values. Suitable amounts of the one or more additional materials may include, but are not limited to, about 1%, about 2%, about 3%, about 4%, about 5%, about 6%, about 7% about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90% by weight based on total weight of the support, or any range including and/or in between any two of these values.

In any embodiment disclosed herein, the support may include about 1% to about 90% by weight of alumina, based on total weight of the support. Suitable amounts of alumina may include, but are not limited to, about 1%, about 2%, about 3%, about 4%, about 5%, about 6%, about 7% about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90% by weight based on total weight of the support, or any range including and/or in between any two of these values. In any embodiment disclosed herein, the support may include only the kaolin clay.

In any embodiment disclosed herein, the alumina may further include a rare earth element. For example, in any embodiment disclosed herein, the rare earth element may be selected yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof. In any embodiment disclosed herein, the rare earth element may be lanthanum. In any embodiment, the support may include rare earth perovskites of aluminum. Suitable rare earth perovskites of aluminum may include $LaAlO_3$, $CeAlO_3$, $GdAlO_3$, $YbAlO_3$, $LuAlO_3$, $TmAlO_3$, $ErAlO_3$, $HoAlO_3$, $DyAlO_3$, $TbAlO_3$, $EuAlO_3$, $SmAlO_3$, $PmAlO_3$, $NdAlO_3$, $PrAlO_3$, $SeAlO_3$, $YAlO_3$, or combinations of two or more thereof. In any embodiment disclosed herein, the alumina may include the rare earth element in an amount of about 0.1% to about 12% by weight, based on total weight of the support.

For example, in any embodiment disclosed herein, the amount of the rare earth element may be about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12% by weight based on total weight of the support, or any range including and/or in between any two of these values. In any embodiment disclosed herein, the alumina may include the rare earth element in an amount of about 0.1% to about 9%, about 0.1%, to about 6%, about 0.1% to about 4% by weight based on total weight of the support, or any range including and/or in between any two of the preceding values.

In any embodiment disclosed herein, the alumina may further include an alkaline earth element. For example, in any embodiment disclosed herein, the alkaline earth element may be selected from magnesium, calcium, strontium, or barium. In any embodiment disclosed herein, the alkaline earth element may be strontium. In any embodiment, the support may include one or more strontium-containing phases. For example, the strontium-containing phase may include, but is not limited to, $SrAl_2O_4$ or $SrTiO3$. In any embodiment disclosed herein, the alumina may include the alkaline earth element in an amount of about 0.1% to about 12% by weight, based on total weight of the support.

For example, in any embodiment disclosed herein, the amount of the alkaline earth element may be about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12% by weight based on total weight of the support, or any range including and/or in between any two of these values. In any embodiment disclosed herein, the alumina may include the alkaline earth element in an amount of about 0.1% to about 9%, about 0.1%, to about 6%, about 0.1% to about 4% by weight based on total weight of the support, or any range including and/or in between any two of the preceding values.

In any embodiment disclosed herein, the support may be provided in any convenient form. For example, in any embodiment, the support may be shaped into spheres such as microspheres. In any embodiment disclosed herein, the support may be in the form of a powder. Another way is to extrude it through a shaping orifice to form an extrudate or tablet.

FCC Catalyst

In a related aspect, the present technology provides a fluid catalytic cracking (FCC) catalyst that includes a support and a FCC component, wherein the support includes a kaolin clay comprising less than or equal to about 0.6% by weight of iron, based on total weight of the catalyst.

In any embodiment herein, the catalyst may include about 0.01% to about 0.6% by weight of iron, based on total weight of the catalyst. For example, in any embodiment disclosed herein, the catalyst may include about 0.01%, about 0.02%, about 0.03%, about 0.04%, about 0.05%, about 0.06%, about 0.07%, about 0.08%, about 0.09%, about 0.1%, about 0.15%, about 0.2%, about 0.25%, about 0.3%, about 0.35%, about 0.4%, about 0.45%, about 0.5%, about 0.55%, about 0.6% by weight of iron, based on total weight of the catalyst, or any range including and/or between any two of these values. In any embodiment disclosed herein, the catalyst may include about 0.01% to about 0.6%, about 0.05% to about 0.5%, about 0.1% to about 0.4%, or 0.1% to about 0.3% by weight of iron, based on total weight of the catalyst.

In any embodiment disclosed herein, the catalyst may be free, or substantially free, of iron. As used herein, the term "substantially free of iron" refers to detectable amounts of iron that may be less than about 0.3%, less than about 0.1%, less than about 0.05%, less than about 0.01% by weight based on total weight of the catalyst. In any embodiment disclosed herein, the catalyst may be free of iron. As used herein, the term "free of iron" indicates the catalyst may not include any detectable amounts of iron.

In any embodiment disclosed herein, the FCC component may include zeolite. For example, the zeolite may include Y-zeolite. In any embodiment disclosed herein, the Y-zeolite may be in situ crystallized Y-zeolite, where the Y-zeolite may be in situ crystallized in and/or on the surface of the support. In any embodiment disclosed herein, the catalyst may include about 5% to about 60% by weight of Y-zeolite based on total weight of the catalyst. For example, in any embodiment disclosed herein, the catalyst may include about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28% about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about $1%, about 52%, about 53%, about 54%, about 55%, about 56%, about $7%, about 58%, about 59%, about 60% by weight based on total weight of the catalyst, or any range including and/or in between any two of these values. In any embodiment disclosed herein, the catalyst may include about 5% to about 60%, about 20% to about 60%, about 5% to about 40%, about 10% to about 35%, about 10% to about 30% by weight based on total weight of the catalyst, or any range including and/or in between any two of these values.

In any embodiment disclosed herein, the catalyst may include Y-zeolite having less than about 5.0 iron atoms present in the tetrahedral zeolite framework sites. For example, in any embodiment disclosed herein, the catalyst may include Y-zeolite having less than about 5.0, about 4.5, about 4.0, about 3.5, about 3.0, about 2.5, about 2.0, about 1.5, about 1.0, about 0.9, about 0.8, about 0.7, about 0.6, about 0.5, about 0.4, about 0.3, about 0.2, about 0.1, or any range including and/or in between any two of these values, of iron atoms present in the tetrahedral zeolite framework sites. In any embodiment disclosed herein, the tetrahedral framework sites may be for the NaY form of the catalyst.

In any embodiment disclosed herein, the support may include about 5% to about 100% by weight of the kaolin clay, based on total weight of the support. For example, in any embodiment disclosed herein, the support may include amounts of the kaolin clay of about 5%, about 6%, about 7%, about 8%, about 9%, about 10%, about 11%, about 12%, about 13%, about 14%, about 15%, about 16%, about 17%, about 18%, about 19%, about 20%, about 22%, about 24%, about 26%, about 28%, about 30%, about 32%, about 34%, about 36%, about 38%, about 40%, about 42%, about 44%, about 46%, about 48%, about 50%, about 52%, about 54%, about 56%, about 58%, about 60%, about 62%, about 64%, about 66%, about 68%, about 70%, about 72%, about 74%, about 76%, about 78%, about 80%, about 82%, about 84%, about 86%, about 88%, about 90%, about 92%, about 94%, about 96%, about 98%, 100% by weight based on total weight of the support, or any range including and/or in between any two of these values by weight based on total weight of the support, or any range including and/or in between any two of these values.

In any embodiment disclosed herein, the kaolin clay may include a calcined kaolin clay. In any embodiment disclosed herein, the kaolin clay may include a mixture of calcined kaolin clay and uncalcined kaolin clay. Additionally or alternatively, in some embodiments, the mixture of calcined and uncalcined clay may undergo further calcination at a temperature around that of the kaolin exotherm (e.g., about 1000° C.) or at a higher temperature sufficient to transform the clay to a mixture of mullite and amorphous silica. The mixture of calcined and uncalcined kaolin clay may be obtained by spray drying the mixture, pulverizing the mixture, calcining the mixture to around the exotherm temperature of kaolin, and pulverizing the calcined mixture.

In any embodiment disclosed herein, the catalyst may include one or more additional materials. For example, in any embodiment disclosed herein, the one or more additional materials may include sodium silicate, transitional alumina, aluminum hydroxides, aluminum trihydroxides, aluminum oxide and/or hydroxides doped with rare earth elements or alkaline earth elements, tin oxide, bismuth oxide, or a combination of two or more thereof. In any embodiment, In any embodiment disclosed herein, the catalyst may further include alumina. For example, in any embodiment disclosed herein, the alumina may be a transitional alumina. Suitable transitional alumina may include, but is not limited to, $\gamma\text{-}Al_2O_3$, $\eta\text{-}Al_2O_3$, $\delta\text{-}Al_2O_3$, $\theta\text{-}Al_2O_3$, $\kappa\text{-}Al_2O_3$, $\chi\text{-}Al_2O_3$, or a combination of two or more thereof.

In any embodiment disclosed herein, the catalyst may include about 1% to about 90% by weight of the one or more additional materials, based on total weight of the catalyst. For example, the catalyst may include about 1% to about 90%, about 5% to about 70%, about 10% to about 60%, about 20% to about 40% by weight of the one or more additional materials based on total weight of the catalyst, or any range including and/or in between any two of the preceding values. Suitable amounts of the one or more additional materials may include, but are not limited to, about 1%, about 2%, about 3%, about 4%, about 5%, about 6%, about 7% about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90% by weight based on total weight of the catalyst, or any range including and/or in between any two of these values.

In any embodiment disclosed herein, the catalyst may include about 1% to about 90% by weight of alumina, based on total weight of the catalyst. Suitable amounts of alumina may include, but are not limited to, about 1%, about 2%, about 3%, about 4%, about 5%, about 6%, about 7% about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90% by weight based on total weight of the catalyst, or any range including and/or in between any two of these values.

In any embodiment disclosed herein, the catalyst may further include a rare earth element. For example, in any embodiment disclosed herein, the rare earth element may be selected from yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof. In any embodiment disclosed herein, the rare earth element may be lanthanum. In any embodiment, the catalyst may include rare earth perovskites of aluminum. Suitable rare earth perovskites of aluminum may include $LaAlO_3$, $CeAlO_3$, $GdAlO_3$, $YbAlO_3$, $LuAlO_3$, $TmAlO_3$, $ErAlO_3$, $HoAlO_3$, $DyAlO_3$, $TbAlO_3$, $EuAlO_3$, $SmAlO_3$, $PmAlO_3$, $NdAlO_3$, $PrAlO_3$, $SeAlO_3$, $YAlO_3$, or combinations of two or more thereof. In any embodiment disclosed herein, the catalyst may include the rare earth element in an amount of about 0.1% to about 12% by weight, based on total weight of the catalyst. For example, in any embodiment disclosed herein, the amount of the rare earth element may be about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12% by weight based on total weight of the support, or any range including and/or in between any two of these values. In any embodiment disclosed herein, the catalyst may include the rare earth element in an amount of about 0.1% to about 9%, about 0.1%, to about 6%, about 0.1% to about 4% by weight based on total weight of the catalyst, or any range including and/or in between any two of the preceding values.

In any embodiment disclosed herein, the catalyst may further include an alkaline earth element. For example, in any embodiment disclosed herein, the alkaline earth element may be selected from magnesium, calcium, strontium, or barium. In any embodiment disclosed herein, the alkaline earth element may be strontium. In any embodiment, the catalyst may include one or more strontium-containing phases. For example, the strontium-containing phase may include, but is not limited to, $SrAl_2O_4$ and $SrTiO_3$. In any embodiment disclosed herein, the catalyst may include the alkaline earth element in an amount of about 0.1% to about 12% by weight, based on total weight of the catalyst. For example, in any embodiment disclosed herein, the amount of the alkaline earth element may be about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12% by weight based on total weight of the catalyst, or any range including and/or in between any two of these values. In any embodiment disclosed herein, the catalyst may include the alkaline earth element in an amount of about 0.1% to about 9%, about 0.1%, to about 6%, about 0.1% to about 4% by weight based on total weight of the catalyst, or any range including and/or in between any two of the preceding values.

In any embodiment disclosed herein, the catalyst may have a unit cell size (UCS) of about 24.10 Å to about 24.75 Å. For example, in any embodiment disclosed herein, the catalyst may have a UCS of about 24.10 Å, about 24.15 Å, about 24.20 Å, about 24.25 Å, about 24.30 Å, about 24.35 Å, about 24.40 Å, about 24.45 Å, about 24.50 Å, about 24.55 Å, about 24.60 Å, about 24.65 Å, about 24.70 Å, about 24.75 Å, or any range including and/or in between any two of these values.

In any embodiment disclosed herein, the catalyst may have a zeolite surface area of about 30 m$^2$/g to about 400 m$^2$/g. For example, in any embodiment disclosed herein, the catalyst may have a zeolite surface area (ZSM) of about 30 m$^2$/g, about 35 m$^2$/g, about 40 m$^2$/g, about 45 m$^2$/g, about 50 m$^2$/g, about 55 m$^2$/g, about 60 m$^2$/g, about 65 m$^2$/g, about 70 m$^2$/g, about 75 m$^2$/g, about 80 m$^2$/g, about 85 m$^2$/g, about 90 m$^2$/g, about 95 m$^2$/g, about 100 m$^2$/g, about 105 m$^2$/g, about 110 m$^2$/g, about 115 m$^2$/g, about 120 m$^2$/g, about 125 m$^2$/g, about 130 m$^2$/g about 135 m$^2$/g, about 140 m$^2$/g, about 145 m$^2$/g, about 150 m$^2$/g, about 155 m$^2$/g, about 160 m$^2$/g, about 165 m$^2$/g, about 170 m$^2$/g, about 175 m$^2$/g, about 190 m$^2$/g, about 195 m$^2$/g, about 200 m$^2$/g, about 205 m$^2$/g, about 210 m$^2$/g, about 215 m$^2$/g, about 220 m$^2$/g, about 225 m$^2$/g, about 230 m$^2$/g, about 235 m$^2$/g, about 240 m$^2$/g, about 245 m$^2$/g, about 250 m$^2$/g, about 255 m$^2$/g, about 260 m$^2$/g, about 265 m$^2$/g, about 270 m$^2$/g, about 275 m$^2$/g, about 280 m$^2$/g, about 285 m$^2$/g, about 290 m$^2$/g, about 295 ml/g, about 300 m$^2$/g, about 305 m$^2$/g, about 310 m$^2$/g about 315 m$^2$/g, about 320 m$^2$/g, about 325 m$^2$/g, about 330 m$^2$/g, about 335 m$^2$/g, about 340 m$^2$/g, about 345 m$^2$/g, about 350 m$^2$/g, about 355 m$^2$/g, about 360 m$^2$/g, about 365 m$^2$/g, about 370 m$^2$/g, about 375 m$^2$/g, about 380 m$^2$/g, about 385 m$^2$/g, about 390 m$^2$/g, about 395 m$^2$/g, about 400 m$^2$/g, or any range including and/or in between any two of these values.

In any embodiment disclosed herein, the catalyst may have a matrix surface area (MSA) of about 50 m$^2$/g to about 200 50 m$^2$/g. For example, in any embodiment disclosed herein, the catalyst may have a matrix surface area of about 50 m$^2$/g, about 55 m$^2$/g, about 60 m$^2$/g, about 65 m$^2$/g, about 70 m$^2$/g, about 75 m$^2$/g, about 80 m$^2$/g, about 85 m$^2$/g, about 90 m$^2$/g, about 95 m$^2$/g, about 100 m$^2$/g, about 105 m$^2$/g, about 110 m$^2$/g, about 115 m$^2$/g, about 120 m$^2$/g, about 125 m$^2$/g, about 130 m$^2$/g, about 135 m$^2$/g, about 140 m$^2$/g, about 145 m$^2$/g, about 150 m$^2$/g about 155 m$^2$/g, about 160 m$^2$/g, about 165 m$^2$/g, about 170 m$^2$/g, about 175 m$^2$/g, about 180 m$^2$/g, about 185 m$^2$/g, about 190 m$^2$/g about 195 m$^2$/g, about 200 m$^2$/g, or any range including and/or in between any two of these values.

In any embodiment disclosed herein, the catalyst may have a zeolite to matrix (Z/M) ratio of about 0.3 to about 3. As described herein, the term "Z/M" (or "zeolite to matrix ratio") refers to the ratio of zeolite surface area to matrix surface area. In any embodiment disclosed herein, the catalyst may have a Z/M of about 0.3, about 0.4, about 0.5, about 0.6, about 0.7, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, or any range including and/or in between any two of these values.

In any embodiment disclosed herein, the catalyst may include a $Na_2O$ content of less than 1% by weight based on total weight of the catalyst. For example, in any embodiment disclosed herein, the catalyst may have a $Na_2O$ content of less than about 1%, about 0.9%, about 0.8%, about 0.7%, about 0.6%, about 0.5%, about 0.4%, about 0.3%, about 0.2%, about 0.1%, about 0.09%, about 0.08%, about 0.07%, about 0.06%, about 0.05%, about 0.04%, about 0.03%, about 0.02%, about 0.01%, or any range including and/or in between any two of the preceding values.

In any embodiment disclosed herein, the catalyst may include about 5 to about 20% kaolinite and about 70 to about 90% alumina. For example, in any embodiment disclosed herein, the catalyst may include about 10% kaolinite and about 90% alumina.

In any embodiment disclosed herein, the FCC catalyst may be provided in any convenient form. For example, in any embodiment, the FCC catalyst may be shaped into microspheres. In any embodiment disclosed herein, the FCC catalyst may be in the form of a powder. Another way is to extrude it through a shaping orifice to form an extrudate or tablet.

In another aspect, the present technology provides a catalyst composition that includes a first FCC catalyst comprising a support and a FCC component, wherein the support comprises a kaolin clay comprising less than or equal to about 0.6% by weight of iron, based on total weight of the catalyst; and one or more additional FCC catalysts comprising greater than about 0.7% by weight of iron, based on total weight of the additional FCC catalyst.

In any embodiment disclosed herein, the composition may include about 1% to about 99% by weight of the first FCC catalyst based on weight of the composition. Suitable amounts of the first FCC catalyst may include about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99% by weight based on weight of the composition, or any range including and/or in between any two of the preceding values. For example, the first catalyst may be present in an amount from about 1% to 99%, about 5% to about 85%, about 10% to about 70%, about 15% to about 60%, about 20% to about 50% by weight based on weight of the composition, or any range including and/or in between any two of the preceding values.

In any embodiment disclosed herein, the composition may include about 1% to about 99% by weight of the one or more additional FCC catalyst based on weight of the composition. Suitable amounts of the one or more additional catalyst FCC catalyst may include about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99% by weight based on weight of the composition, or any range including and/or in between any two of the preceding values. For example, the first catalyst may be present in an amount from about 1% to 99%, about 5% to about 85%, about 10% to about 70%, about 15% to about 60%, about 20% to about 50% by weight based on weight of the composition, or any range including and/or in between any two of the preceding values.

In any embodiment disclosed herein, the composition may further include one or more additives. For example, the additives may include catalysts, which may include a zeolitic component. Suitable zeolitic components may include, but are not limited to, zeolite X, ZSM-5, beta zeolite, ZXM-11, ZSM-14, ZSM-17, ZWM-18, ZSM-20, ZSM-31, ZSM-34, ZSM-41, ZSM-46, mordenite, chabazite, IM-5 zeolite, or mixtures of two or more thereof. In any embodiment disclosed herein, the composition may include about 1% to about 80% by weight of the one or more additives, based on total weight of the composition. For example, the composition may include about 1% to about 80%, about 5% to about 70%, about 10% to about 60%, about 20% to about 40% by weight of the one or more additives based on total weight of the composition, or any range including and/or in between any two of the preceding values. Suitable amounts of the one or more additives may include, but are not limited to, about 1%, about 2%, about 3%, about 4%, about 5%, about 6%, about 7% about 8%, about 9%, about 10%, about 15%, about 20%, about 25%, about 30%, about 35%, about 40%, about 45%, about 50%, about 55%, about 60%, about 65%, about 70%, about 75%, about 80% by weight based on total weight of the composition, or any range including and/or in between any two of these values.

Method of Use

In a related aspect, the present technology provides a method of cracking a hydrocarbon feed comprising contacting said feed with a FCC catalyst that includes a FCC catalyst as described herein in any embodiment.

The present invention, thus generally described, will be understood more readily by reference to the following examples, which are provided by way of illustration and are not intended to be limiting of the present invention.

EXAMPLES

Example 1. FCC Catalyst Preparation. A high-iron content (Comparative [UMF]) and low-iron (Example-A [ASP-672]) Microspheres containing kaolin clay were prepared via spray drying. Iron content for the microspheres was 0.89 wt % (Comparative Microsphere) and 0.47 wt % (Example-A Microsphere). Other aspects of chemical composition (except $TiO_2$, with iron) were similar. Microspheres were calcined at 1500° F. (to metakaolin) and at 1800° F. (to spinel). Phase changes were similar and as expected. Sodium hydroxide was added, and Y zeolite was crystallized with internal seeding at 100° F. and growth at 180° F. to obtain Comparative and Example-A FCC Catalysts. No added sodium silicate was used in the crystallization.

Crystallization reactors for preparing the Example-A FCC Catalyst contained the Example-A Microspheres, water, and caustic. Similarly, crystallization reactors for preparing Comparative FCC catalysts also contained some MS-2. Internal seeding was conducted at 100° F. As the reaction mixture is heated, exothermic reactions occur. A cold finger was used to control temperature as the heating mantle is slowly heated. Water is run thru the cold fingers during the entire 100° F. internal seeding period and heated up to 180° F.

Internal seeding proceeded for six hours and then temperature was increased to 180° F. These materials were worked up to finished product. Catalysts were steamed (1450° F./24 hr/100% steam) yielding essentially identical surface areas and steamed unit cell size parameters, as noted in Table 3.

TABLE 1

Fe$_2$O$_3$ (wt %) content in microspheres and FCC Catalyst

| | Example-A | Comparative |
|---|---|---|
| Microsphere | 0.47 | 0.89 |
| Finished Product (FCC Catalyst) | 0.59 | 1.20 |

Without being bound by theory, it is believed that some iron from clay is incorporated during crystallization into NaY, such that "deironization" occurs faster than "dealumination." Acidic water or steam is expected to add to tetrahedral iron (a larger structural moiety than tetrahedral aluminum) more readily, resulting in expulsion of iron from the zeolite framework. This behavior is believed sometimes to degrade zeolite surface area. Table 2 shows that the Example-A FCC Catalyst has superior Y zeolite surface area stability than the Comparative FCC Catalyst. The zeolite stability observations suggest iron is incorporated into NaY zeolite.

TABLE 2

Zeolite surface stability comparisons of Example-A and Comparative FCC Catalysts.

| | Example-A | Comparative |
|---|---|---|
| ZSA stability NaY to steamed | 41% | 36% |
| ZSA stability NaY to Final Product | 71% | 66% |
| ZSA stability Final Product to Steamed | 58% | 54% |

Table 3 shows excellent agreement among the pair of catalysts for steamed surface area and unit cell parameter. There is a 2-fold difference in iron content between the two catalysts. The Example-A and Comparative FCC Catalysts exhibited mercury pore volumes of about 0.40 ml/g for pores with less than 600 Å in diameter, and mercury pore volumes of 0.01 ml/g (Example-A) and 0.03 ml/g (Comparative) for pores with >600 Å in diameter.

TABLE 3

Steamed physicochemical properties of Example-A and Comparative FCC Catalysts

| | Example-A | Comparative |
|---|---|---|
| Steamed at 1450° F./24 hrs | | |
| Total Surface Area (TSA), m$^2$/g | 237 | 235 |
| Matrix Surface Area (MSA), m$^2$/g | 152 | 155 |
| Zeolite Surface Area (ZSA), m$^2$/g | 85 | 80 |
| Unit Cell Size (UCS), | 24.3 | 24.3 |
| Fe$_2$O$_3$, wt % | 0.59 | 1.20 |
| Al$_2$O$_3$, wt % | 60.8 | 59.2 |
| La$_2$O$_3$, wt % | 0.86 | 0.84 |
| Na$_2$O, wt % | 0.05 | 0.07 |
| SiO$_2$, wt % | 35.4 | 34.6 |

The Example-A FCC Catalyst exhibited decreased Lewis acidity, primarily in the matrix, over the Comparative FCC Catalyst. Without being bound by theory, it is believed that decreased levels of matrix Lewis acidity correlates with reduced coke yield.

| | Example-A | Comparative |
|---|---|---|
| Brønsted 180° C. | 90 | 126 |
| Brønsted 400° C. | 13 | 15 |
| Lewis 180° C. | 152 | 261 |
| Lewis 400° C. | 105 | 157 |

Figure 1B:
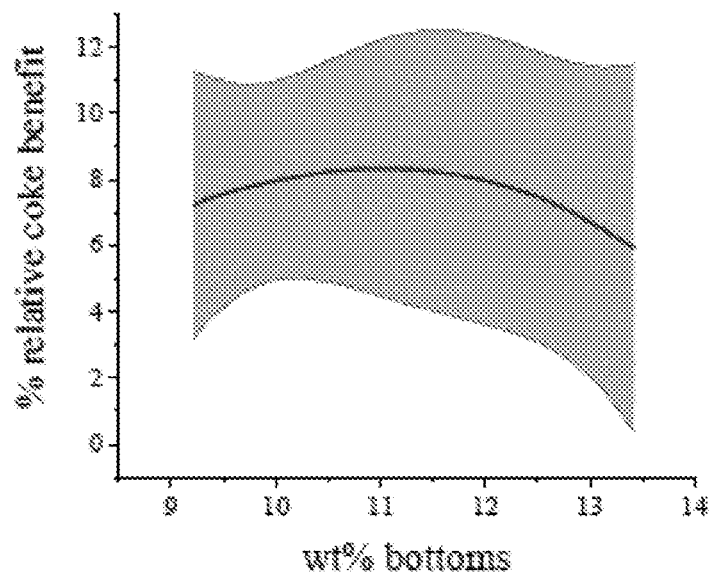
FIG. 1B is a graph showing a plot of the % relative coke benefit vs bottoms (wt %) for Example-A FCC Catalyst, where the linear plot is a least squares regression correlation and the shaded area is a 90% confidence band about the regression correlation.

Example 2. Catalytic Testing of Example-A and Comparative FCC Catalysts. The Example and Comparative Catalysts were tested using Advanced Cracking Evaluation (ACE), with gasoil feed, constant time on stream. A range of C/O (mass of catalyst to mass of oil, a parameter analogous to space velocity) were evaluated in randomized order. Each catalyst was tested nine times. Six different C/O values were used, and three duplicates were tested. Examination of residuals of linear regression analyses indicated curvature, so quadratic fits were used. FIGS. 1A and 1B show the Example-A FCC Catalyst yielded about 8% relative less coke than the Comparative FCC Catalyst. Benefits at highest bottoms conversion (lowest wt % bottoms) is of most interest, and in that area, the benefit ranges from about 7.3 to 8.3% lower coke relative to the Comparative FCC Catalyst.

Figure 2A:
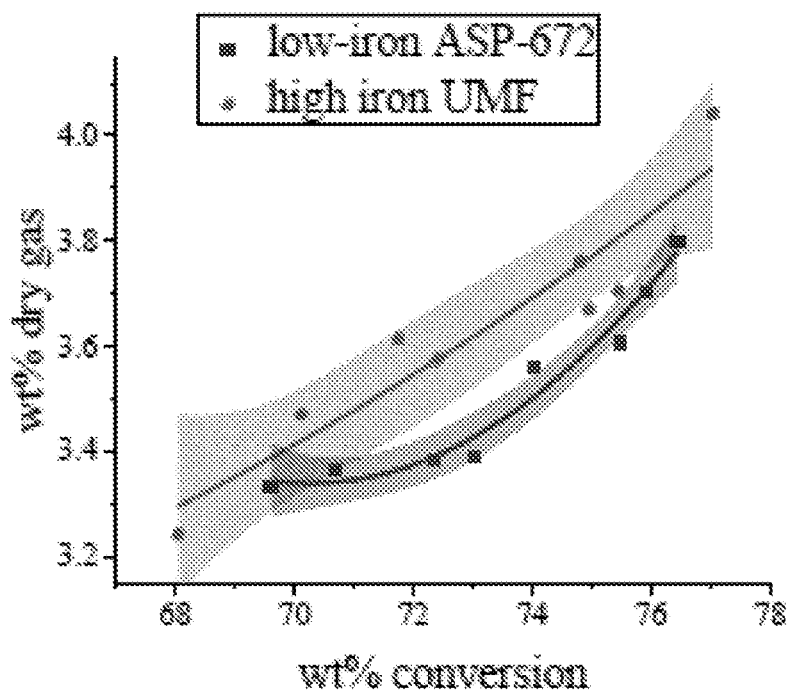
FIG. 2A is a two line graph showing dry gas yield (wt %) vs conversion (wt %) plotted for Example-A and Comparative FCC Catalysts, where the data points represent experimental data, the linear plot is a least squares regression correlation, and the shaded area is a 90% confidence band about the regression correlation.
Figure 2B:
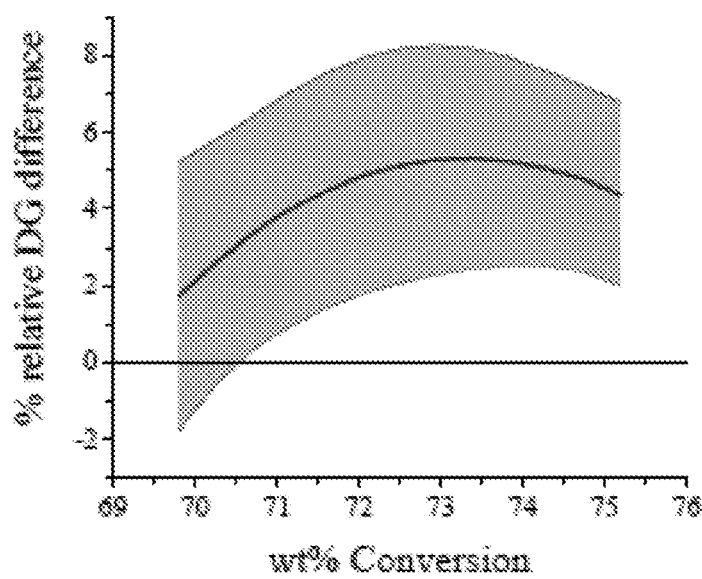
FIG. 2B is a graph showing a plot of the % relative dry gas (DG) difference versus conversion (wt %) for Example-A FCC Catalyst, where the linear plot is a least squares regression correlation and the shaded area is a 90% confidence band about the regression correlation.
Figure 3A:
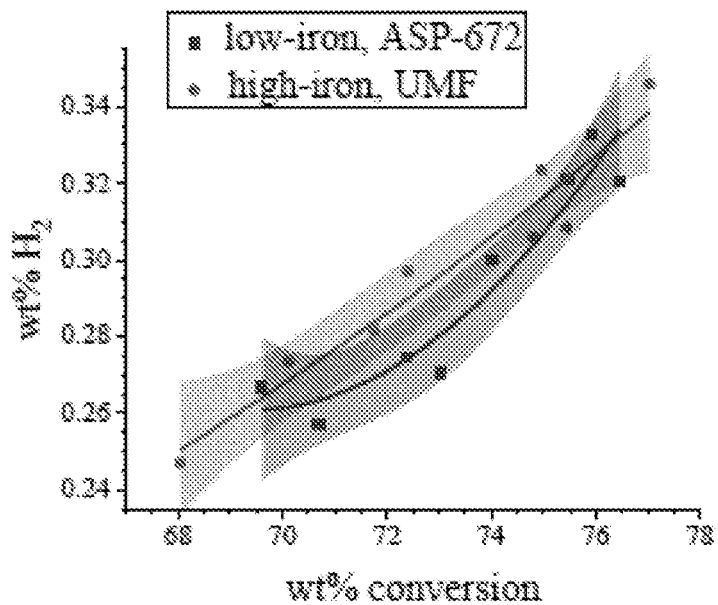
FIG. 3A is a two line graph showing Hz yield (wt %) versus conversion (wt %) plotted for Example-A and Comparative FCC Catalysts, where the data points represent experimental data, the linear plot is a least squares regression correlation, and the shaded area is a 90% confidence band about the regression correlation.
Figure 3B:
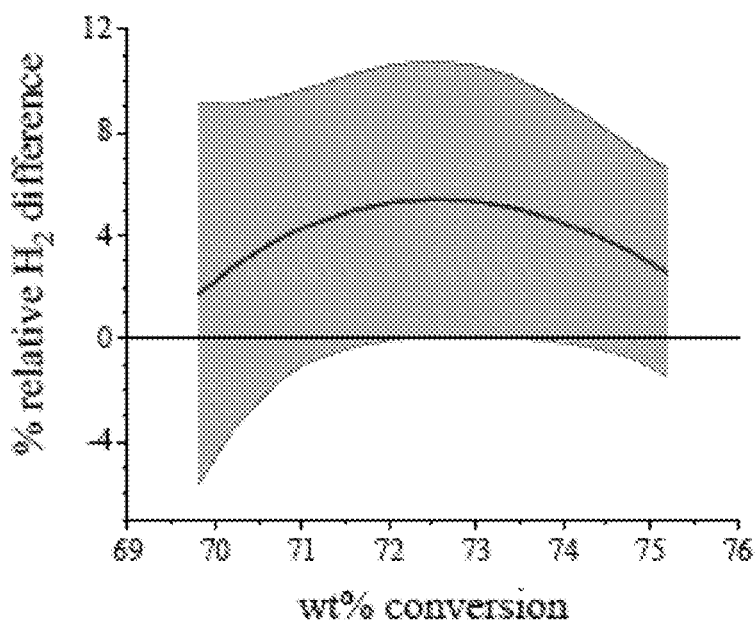
FIG. 3B is a graph showing a plot of the % relative Hz difference versus conversion (wt %) for Example-A FCC Catalyst, where the linear plot is a least squares regression correlation and the shaded area is a 90% confidence band about the regression correlation.
Figure 4A:
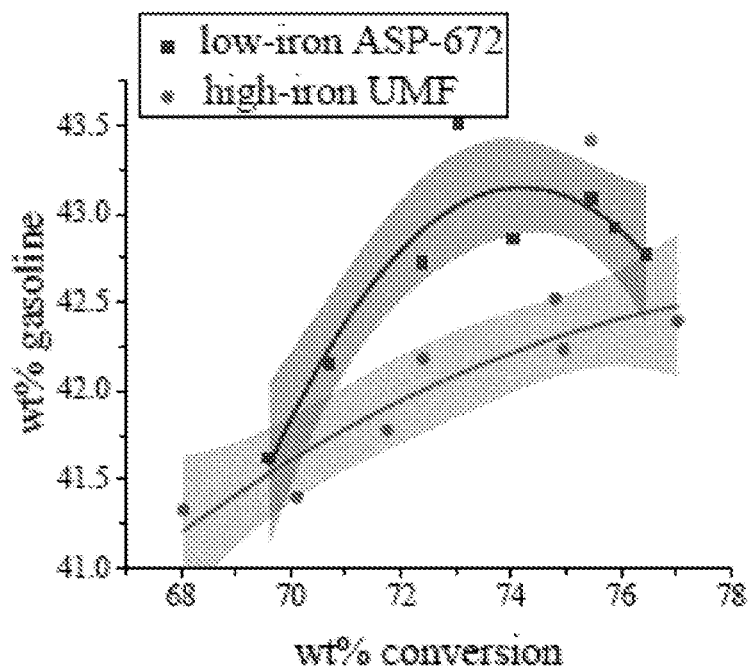
FIG. 4A is a two line graph showing gasoline yield (wt %) vs conversion (wt %) plotted for Example-A and Comparative FCC Catalyst, where the data points represent experimental data, the linear plot is a least squares regression correlation, and the shaded area is a 90% confidence band about the regression correlation.
Figure 4B:
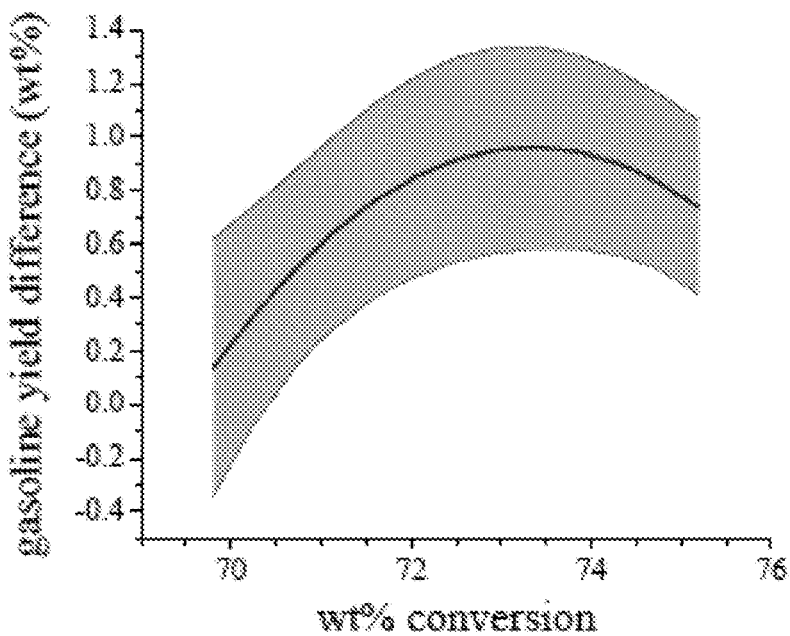
FIG. 4B is a graph showing a plot of the gasoline yield difference (w (%) versus conversion (wt %) plotted for Example-A FCC Catalyst, where the linear plot is a least squares regression correlation and the shaded area is a 90% confidence band about the regression correlation.

FIGS. 2A and 2B show the Example-A FCC Catalyst makes less dry gas compared to the Comparative FCC Catalyst. The benefit, over most of the conversion range, is 4-5% relatively lower than the Comparative FCC Catalyst (FIG. 2B). As shown in FIGS. 3A and 3B, the Example-A FCC Catalyst makes less H$_2$ relative to the Comparative FCC Catalyst. FIGS. 4A and 4B show that the Example-A FCC Catalyst exhibits a gasoline the benefit, making up to 0.95 wt % more gasoline than the Comparative FCC Catalyst.

Figure 5A:
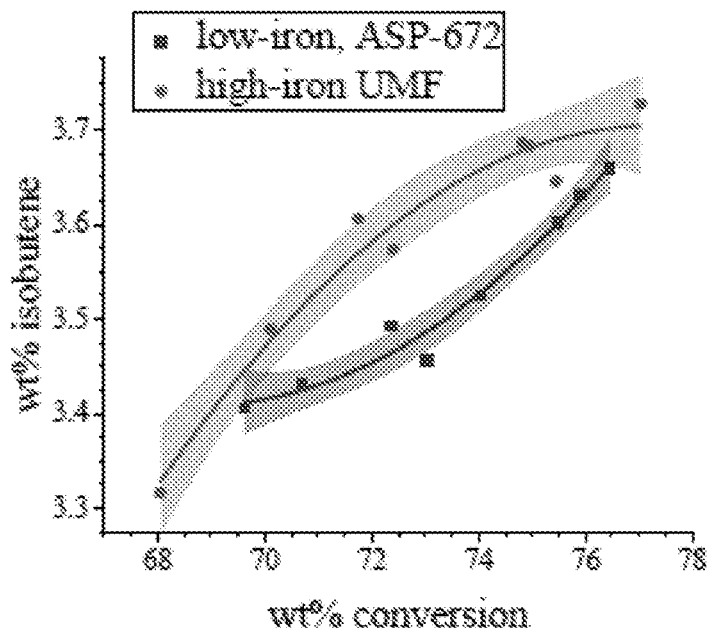
FIG. 5A is a two line graph showing plots of isobutene yield (wt %) versus conversion (w (%) plotted for Example-A and Comparative FCC Catalysts, where the data points represent experimental data, the linear plot is a least squares regression correlation, and the shaded area is a 90% confidence band about the regression correlation.
Figure 5B:
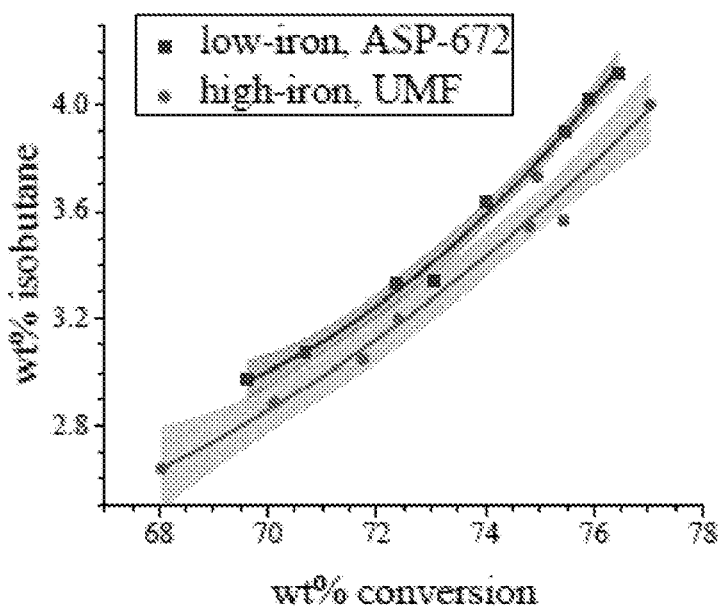
FIG. 5B is a two line graph showing plots of isobutane yield (wt %) versus conversion (w (%) plotted for Example-A and Comparative FCC Catalysts, where the data points represent experimental data, the linear plot is a least squares regression correlation, and the shaded area is a 90% confidence band about the regression correlation.

While the Example-A and Comparative FCC Catalysts yielded identical total C$_4$ and i-C$_4$, the catalysts exhibited different paraffin/olefin splits among the i-C$_4$ compounds. As shown in FIGS. 5A and 5B, the low-iron Example-A FCC Catalyst showed higher isobutane yielded while the Comparative FCC Catalyst yielded higher isobutene.

Example 3. Microspheres were prepared using a low-iron clay (Example-B [CST] Microspheres): the low-iron clay of the Example-B Microspheres have an iron content of 0.376 wt % Fe$_2$O$_3$, and the high-iron content Comparative Microspheres of Example 1 have an iron content of 0.89 wt % Fe$_2$O$_3$. FCC catalysts were prepared and tested according to the procedures outlined in Examples 1 and 2.

The low-iron clay of Example-B is a kaolin clay obtained from a geological deposit. X-ray diffraction analysis reveals the low-iron kaolin clay of Example-B, which is believed to be geologically older, to be more crystalline than the high-iron kaolin clay of the Comparative Microspheres of Example 1, For instance, the 1 −1 0, −1 −1 1, −1 1 1, and 0 −2 1 are readily observed in the low-iron kaolin clay of Example-B but not in the high-iron kaolin clay of the Comparative Microspheres of Example 1. The maximum exotherm temperature, measured via Thermal Gravimetric Analysis/Differential Thermal Analysis, for the low-iron kaolin clay of Example-B is 1007° C. In contrast, the maximum exotherm of the high-iron kaolin clay of the Comparative Microsphere of Example 1 is 1002° C. After calcination at 982° C., the microsphere made the with low-iron kaolin clay of Example-B grows more Y-zeolite than the microsphere made with the high-iron content kaolin clay of Comparative Microsphere of Example 1. Therefore, in order to make a reliable catalytic comparison, it was necessary to grow the same amount of NaY zeolite in the FCC catalysts obtained from both the Example-B and Comparative Microspheres. Thus, preparing the FCC catalyst included optimizing the amount of external metakaolin used to grow Y zeolite in the Comparative Microsphere.

Further evaluation and comparison of the Example-B and Comparative FCC catalysts was performed with respect to Y-zeolite crystallization. Evaluation of the Y zeolite unit cell parameters revealed that the NaY unit cell parameter for the Example-B kaolin clay was consistently smaller than that of the high-iron kaolin clay for the Comparative Example. The difference between NaY unit cell parameter of Example-B and Comparative catalysts is about 0.043 Å. Thus, the NaY in the low-iron kaolin clay (Example-B) Microspheres was estimated to include about 2.6 iron atoms, on average, in the framework of the zeolite.

Figure 6:
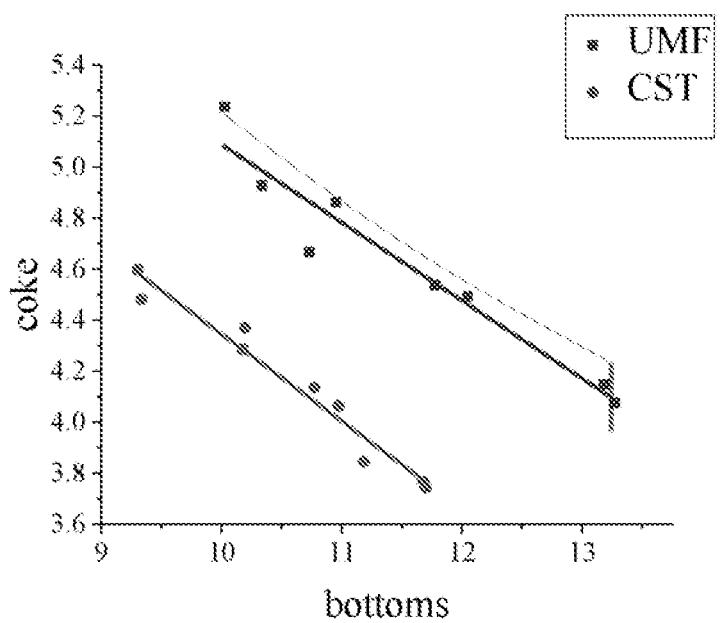
FIG. 6 is a two line graph showing coke (wt %) versus bottoms (wt %) yields plotted for Example-B and Comparative FCC Catalysts, where the data points represent experimental data, the linear plot is a least squares regression correlation, and the shaded area is a 90% confidence band about the regression correlation.
Figure 7:
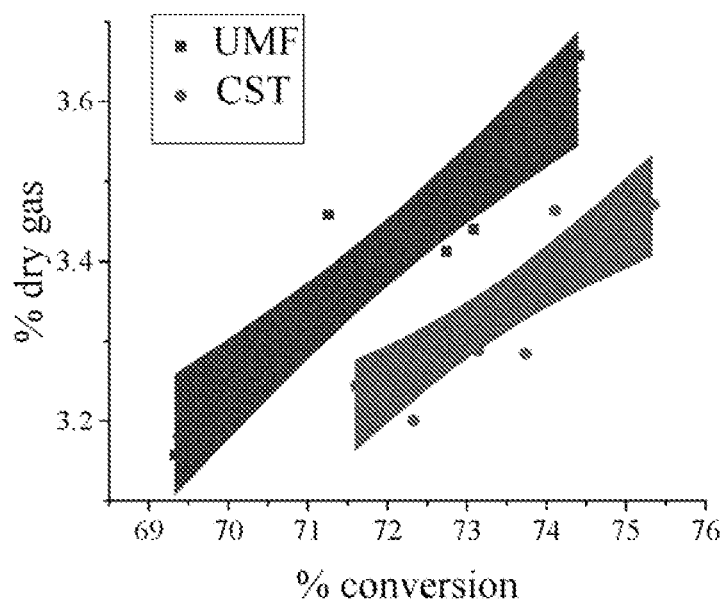
FIG. 7 is a two line graph showing dry gas yield (wt %) versus conversion (wt %) plotted for Example-B and Comparative FCC Catalysts, where the data points represent experimental data, the linear plot is a least squares regression correlation, and the shaded area is a 90% confidence band about the regression correlation.
Figure 8:
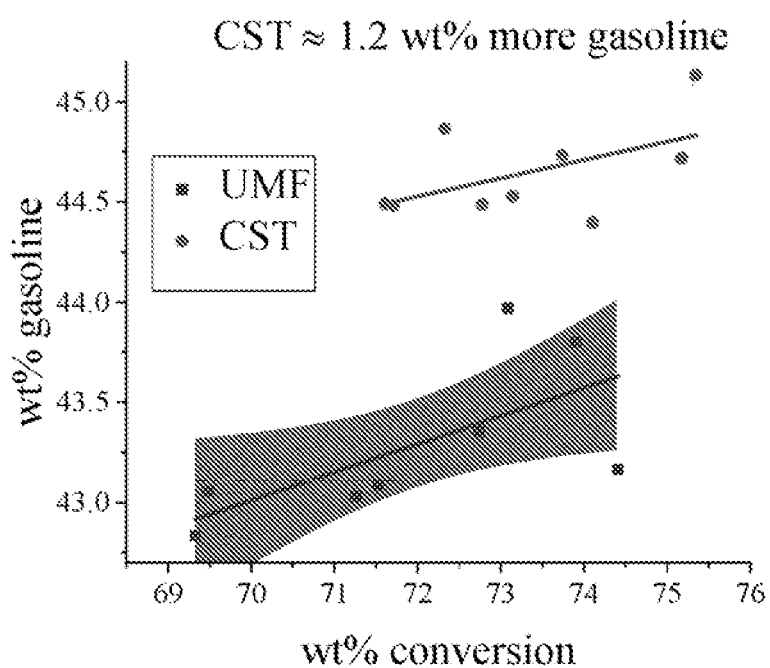
FIG. 8 is a two line graph showing gasoline yield (wt %) versus conversion (wt %) plotted for Example-B and Comparative FCC Catalysts, where the data points represent experimental data, the linear plot is a least squares regression correlation, and the shaded area is a 90% confidence band about the regression correlation.

As shown in FIGS. 6 and 7, the Example-B FCC Catalyst yielded about 16% lower coke and more than 5% lower dry gas relative to the Comparative FCC Catalyst. FIG. 8 shows that the Example-B FCC Catalyst yielded about 1.2 wt % more gasoline than the Comparative FCC Catalyst.

Para. A. A support for a fluid catalytic cracking (FCC) catalyst comprising kaolin clay, wherein the kaolin clay comprises less than or equal to about 0.6% by weight of iron, based on total weight of the support.

Para. B. The support of Para. A, wherein the kaolin clay comprises less than or equal to about 0.5% by weight of iron.

Para. C. The support of Para. A or Para. B, wherein the kaolin clay comprises less than about 0.3% by weight of iron.

Para. D. The support of Paras. A-C, wherein the kaolin clay comprises about 0.01% to about 0.6% by weight of iron.

Para. E. The support of Paras. A-D, wherein the kaolin clay is free, or substantially free, of iron.

Para. F. The support of any one of Paras. A-E, wherein the support comprises about 5% to 100% by weight of the kaolin clay, based on total weight of the support.

Para. G. The support of any one of claims Paras. A-F, wherein the kaolin clay comprises calcined kaolin.

Para. H. The support of any one of Paras. A-G further comprising one or more additional materials selected from sodium silicate, transitional alumina, aluminum hydroxide, aluminum trihydroxide, aluminum oxide and/or hydroxide doped with rare earth elements or alkaline earth elements, tin oxide, bismuth oxide, or a combination of two or more thereof.

Para. I. The support of any one of Paras. A-H further comprising alumina.

Para. J. The support of Paras. A-I, wherein the transitional alumina comprising $\gamma$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$, or a combination of two or more thereof.

Para. K. The support of any one of Paras. A-J, wherein the support comprises about 1% to about 90% by weight of the one or more additional materials, based on total weight of the support.

Para. L. The support of any one of Paras. A-K, wherein the alumina further comprises a rare earth element.

Para. M. The support of Para. L, wherein the rare earth element comprises yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof.

Para. N. The support of Para. L, wherein the rare earth element comprises lanthanum.

Para. O. The support of Para. L, wherein the alumina comprises the rare earth element in an amount of about 0.1% to about 12% by weight, based on total weight of the support.

Para. P. The support of any one of Paras. M-O, wherein the alumina comprises the rare earth element in an amount of about 0.1% to about 6% by weight.

Para. Q. The support of any one of Paras. A-P, wherein the support is in the form of microspheres.

Para. R. A fluid catalytic cracking (FCC) catalyst comprising a support and a FCC component, wherein the support comprises:
a kaolin clay comprising less than or equal to about 0.6% by weight of iron, based on total weight of the catalyst.

Para. S. The catalyst of Para. R, wherein the catalyst comprises less than about 0.5% by weight of iron.

Para. T. The catalyst of Para. R or Para. S, wherein the catalyst comprises less than about 0.3% by weight of iron.

Para. U. The catalyst of any one of Paras. R-T, wherein the catalyst comprises about 0.01% to about 0.6% by weight of iron.

Para. V. The catalyst of any one of Paras. R-U, wherein the catalyst is free, or substantially free, of iron.

Para. W. The catalyst of any one of Paras. R-V, wherein the FCC component comprises zeolite.

Para. X. The catalyst of any one of Paras. R-X, wherein the FCC component comprises Y-zeolite.

Para. Y. The catalyst of any one of Paras. R-X, wherein the Y-zeolite is in situ crystallized in and/or on surface of the support.

Para. Z. The catalyst of any one of Paras. R-Y, wherein the catalyst comprises about 5% to about 60% by weight of Y-zeolite, based on total weight of the catalyst.

Para. AA. The catalyst of any one of Paras. R-Z, wherein the catalyst comprises from about 5% to about 35% by weight of Y-zeolite.

Para. AB. The catalyst of any one of Paras. R-AA, wherein the support comprises about 5% to 100% by weight of the kaolin clay, based on total weight of the support.

Para. AC. The catalyst of any one of Paras. R-AB wherein the kaolin clay comprises calcined kaolin.

Para. AD. The catalyst of any one of Paras. R-AC further comprising one or more additional materials are selected from sodium silicate, transitional alumina, aluminum hydroxide, aluminum trihydroxide, aluminum oxide and/or hydroxide doped with rare earth elements or alkaline earth elements, tin oxide, bismuth oxide, or a combination of two or more thereof.

Para. AE. The catalyst of any one of Paras. R-AD further comprising alumina.

Para. AF. The catalyst of any one of Paras. R-AB, wherein the alumina is a transitional alumina comprising $\gamma$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$ or a combination of two or more thereof.

Para. AG. The catalyst of any one of Paras. R-AF, wherein the catalyst comprises about 1% to about 90% by weight of one or more additional materials, based on total weight of the catalyst.

Para. AH. The catalyst of any one of Paras. R-AG further comprising a rare earth element.

Para. AI. The catalyst of any one of paras R-AH, wherein the rare earth element comprises yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof.

Para. AJ. The catalyst of any one of Paras. R-AI, wherein the rare earth element comprises lanthanum.

Para AK. The catalyst of any one of Paras. R-AJ, wherein the catalyst comprises the rare earth element in an amount of about 0.1% to about 12% by weight, based on total weight of the catalyst.

Para. AL. The catalyst of any one of Paras. R-AK, wherein the catalyst comprises the rare earth element in an amount of about 0.1% to about 3% by weight.

Para. AM. The catalyst of any one of Paras. R-AK, wherein the catalyst comprises a unit cell size of about 24.10 Å to about 24.75 Å.

Para. AN. The catalyst of any one of Paras. R-AM, wherein the catalyst comprises a zeolite surface area of about 30 m$^2$/g to about 400 m$^2$/g.

Para. AO. The catalyst of any one of Paras. R-AN, wherein the catalyst comprises a matrix surface area of about 50 m$^2$/g to about 200 m$^2$/g.

Para. AP. The catalyst of any one of Paras. R-AO, wherein the catalyst comprises a zeolite to matrix (Z/M) ratio of about 0.1 to about 3.

Para. AQ. The catalyst of any one of Paras. R-AP, wherein the catalyst comprises about 10% kaolinite and about 90% alumina.

Para. AR. The catalyst of any one of Paras. R-AQ, wherein the catalyst is in the form of microspheres.

Para. AS. A method of cracking a hydrocarbon feed comprising contacting said feed with a FCC catalyst comprising a FCC catalyst according to any one of Paras. R-AR.

Para. AT. A catalyst composition comprising:
a first FCC catalyst comprising a support and a FCC component, wherein the support comprises a kaolin clay comprising less than or equal to about 0.6% by weight of iron, based on total weight of the first FCC catalyst; and
one or more additional FCC catalysts comprising greater than 0.7% by weight of iron, based on total weight of the additional FCC catalyst.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising." "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A fluid catalytic cracking (FCC) catalyst comprising a support and a FCC component comprising Y-zeolite that has been in situ crystallized in and/or on surface of the support, wherein the support comprises a kaolin clay comprising less than or equal to about 0.5% by weight of iron, based on total weight of the catalyst, and wherein the FCC catalyst exhibits a ratio of zeolite surface area to matrix surface area (Z/M ratio) of about 0.1 to about 2.4.

2. The catalyst of claim 1, wherein the kaolin clay is free, or substantially free, of iron.

3. The catalyst of claim 1, wherein the support comprises about 5% to 100% by weight of the kaolin clay, based on total weight of the support.

4. The catalyst of claim 1, wherein the support further comprises one or more additional materials selected from sodium silicate, transitional alumina, aluminum hydroxide, aluminum trihydroxide, aluminum oxide and/or hydroxide doped with rare earth elements or alkaline earth elements, tin oxide, bismuth oxide, or a combination of two or more thereof.

5. The catalyst of claim 1, wherein the catalyst comprises about 0.01% to about 0.5% by weight of iron.

6. The catalyst of claim 1, wherein the catalyst comprises about 5% to about 60% by weight of Y-zeolite, based on total weight of the catalyst.

7. The catalyst of claim 1, wherein the kaolin clay comprises calcined kaolin.

8. The catalyst of claim 1, wherein the catalyst comprises a zeolite surface area of about 30 m$^2$/g to about 400 m$^2$/g.

9. The catalyst of claim 1, wherein the catalyst comprises a matrix surface area of about 50 m$^2$/g to about 200 m$^2$/g.

10. The catalyst of claim 1, wherein the catalyst is in the form of microspheres.

11. The catalyst of claim 1, wherein the FCC component comprises Y-zeolite having less than about 5.0 iron atoms present in tetrahedral zeolite framework sites.

12. The catalyst of claim 11, wherein the tetrahedral framework sites are for the NaY form of the Y-zeolite.

13. A method of cracking a hydrocarbon feed comprising contacting said feed with a FCC catalyst comprising a FCC catalyst according to claim 1, wherein the FCC catalyst exhibits a ratio of zeolite surface area to matrix surface area (Z/M ratio) of about 0.1 to about 2.4.

14. A catalyst composition comprising:
a first FCC catalyst comprising a support and a FCC component comprising Y-zeolite that has been in situ crystallized in and/or on surface of the support, wherein the support comprises a kaolin clay comprising less than or equal to about 0.5% by weight of iron, based on total weight of the first FCC catalyst, wherein the first FCC catalyst exhibits a ratio of zeolite surface area to matrix surface area (Z/M ratio) of about 0.1 to about 2.4; and
one or more additional FCC catalysts comprising greater than 0.7% by weight of iron, based on total weight of the additional FCC catalyst.

\* \* \* \* \*